United States Patent [19]

Herberg et al.

[11] Patent Number: 4,551,515

[45] Date of Patent: Nov. 5, 1985

[54] PROCESS FOR THE CONTINUOUS MANUFACTURE OF SILICONE GUMS

[75] Inventors: Michael J. Herberg, Troy; Rudolph F. Macander, Clifton Park; Todd R. Stegman, Troy, all of N.Y.

[73] Assignee: General Electric Company, Waterford, N.Y.

[21] Appl. No.: 584,060

[22] Filed: Feb. 27, 1984

[51] Int. Cl.$^4$ .............................................. C08G 77/06
[52] U.S. Cl. ........................................ 528/18; 528/14; 528/31; 528/33; 528/37
[58] Field of Search .................. 528/37, 14, 31, 33, 528/18

[56] References Cited

U.S. PATENT DOCUMENTS

| | | | |
|---|---|---|---|
| 2,546,036 | 3/1951 | Marsden | 260/46.5 |
| 2,634,252 | 4/1953 | Warrick | 260/46.5 |
| 3,433,765 | 3/1969 | Geipel | 260/46.5 |
| 3,803,084 | 4/1974 | Schnurrbusch et al. | 260/46.5 G |
| 4,128,568 | 12/1978 | Buchner et al. | 260/448.2 E |
| 4,250,290 | 2/1981 | Petersen | 528/14 |

*Primary Examiner*—Melvyn I. Marquis
*Attorney, Agent, or Firm*—Gary L. Loser

[57] ABSTRACT

A process for the continuous polymerization of polydiorganosiloxanes comprising:

(a) mixing one or more cyclopolysiloxane monomers with one or more chainstopping agents,
(b) preheating the mixture resulting from (a),
(c) adding to the preheated mixture of (b) an amount of catalyst effective for catalyzing a polymerization reaction,
(d) polymerizing the catalyzed mixture of (c) in a screw extruder having essentially plug flow therethrough, and
(e) adding to the resulting polymer an amount of neutralizing agent effective for neutralizing said catalyst.

25 Claims, 1 Drawing Figure

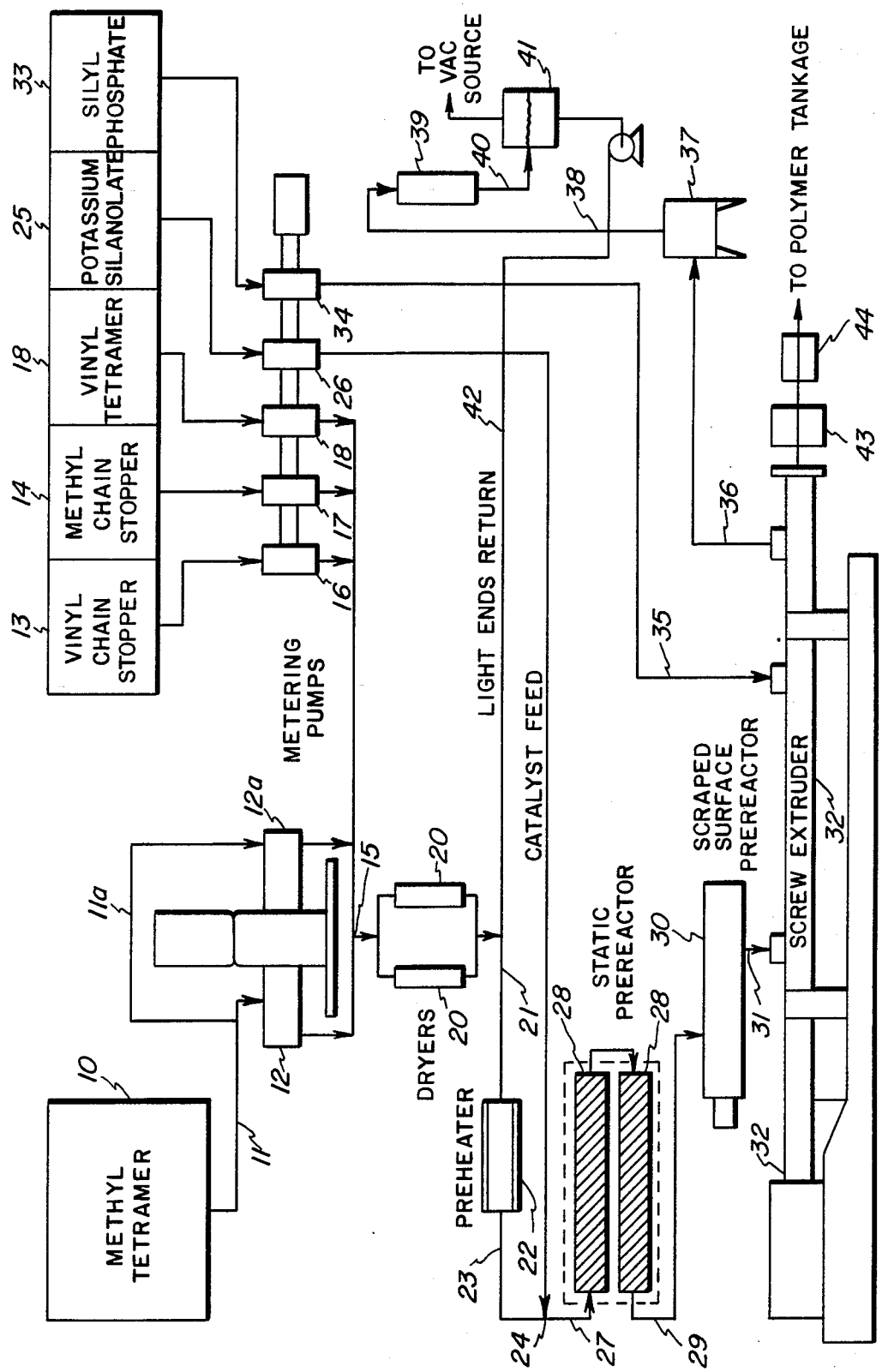

PROCESS FOR THE CONTINUOUS MANUFACTURE OF SILICONE GUMS

BACKGROUND OF THE INVENTION

The present invention generally relates to a novel process for the production of silicone polymers. More particularly, the present invention relates to a continuous process for the production of high molecular weight polydiorganosiloxane gums from cyclic polysiloxanes.

An early method for preparing silicone gums was provided by Marsden in U.S. Pat. No. 2,546,036. Marsden taught the art that polydimethylsiloxane gums can be prepared by treating low molecular weight liquid polydimethylsiloxanes with sodium hydroxide as a catalyst. At room temperature, from 2 to 10 or 15 days may be required to convert the dimethyl silicone liquid to an elastic gum having suitable properties. At temperatures on the order of from 50° to 150° C. the conversion can be effected in from 10 to 96 hours.

Warrick, in U.S. Pat. No. 2,634,252, disclosed an effective catalyst for preparing gums from the standpoint of speed, viscosity control and product quality. However, for use of the Warrick catalyst it has been considered necessary to eliminate linear siloxanes and react only cyclic siloxanes in the presence of the catalyst.

In both of the foregoing instances it was necessary that the reaction or process be carried out in a batch mode as the reaction time was excessive and/or equipment was not available which would allow for a continuous process. Accordingly, research efforts for reducing the amount of time or manpower necessary to manufacture silicone gums has centered on the use of alternate catalysts or on attempts to provide a continuous process for making such silicone gums. Examples of alternate catalysts well known to those skilled in the art include potassium hydroxide, potassium silanolate, and, as described in U.S. Pat. No. 3,433,765, the catalyst derived by the reaction of a tetra-alkyl ammonium hydroxide and a siloxane tetramer.

One example of utilizing an apparatus to reduce the time required to manufacture silicone gums is found in U.S. Pat. No. 3,803,084 to Schnurrbusch et al. Briefly, Schnurrbusch et al. teaches that high polymer polyorganosiloxanes are prepared by stirring oligomeric organosiloxanes and a catalyst in an upright container. The stirring is effected with a spiral stirrer disposed along the wall of the container, while the center of the container is free of conveyor means for free axial flow of the polymerizing material therethrough. Such apparatus reduces the time necessary to effect polymerization from 7 hours to about 5 hours.

U.S. Pat. No. 4,128,568 to Buchner et al. discloses a continuous process for the preparation of polydiorganosiloxanes. Diorganosiloxanes, preferably cyclic siloxanes, are reacted with substances which regulate the polymer chain length in the presence of acid or alkaline reaction catalysts at temperatures between 20° and 180° C. The invention is characterized in that the individual components are mixed mechanically in certain proportions, the mixing and the reaction taking place in a reactor consisting of several zones, and provided with stirring or conveying elements in which in the adjacent zones opposite flows of the material to be reacted are produced by appropriate arrangement of the stirring or conveying elements. According to Buchner et al., a reaction mixture, after a residence time of about four hours, produced a polymer with a viscosity of 100,000 centipoise at 25° C.

Petersen, U.S. Pat. No. 4,250,290, describes a process for the continuous polymerization of polydiorganosiloxanes having a viscosity of up to about 1,000,000 centipoise at 25° C. Briefly, the process involves mixing cyclopolysiloxanes with an effective amount of catalyst, passing such mixture into an apparatus having static elements which provide essentially uniform plug flow characteristics to the catalyzed mixture passing therethrough, controlling the polymer viscosity by adding to the reaction zone from 100 to 500 parts per million water as a chainstopper and neutralizing the catalyst when the reaction is completed.

From the foregoing it can be appreciated that completely satisfactory methods for carrying out the continuous polymerization of polydiorganosiloxanes, particularly polydiorganosiloxane gums, have not been successfully provided.

SUMMARY OF THE INVENTION

It is a primary object of the present invention to provide a process for the continuous polymerization of polydiorganosiloxanes, especially polydiorganosiloxane gums having a viscosity of from about 2 million to about 150 million centipoise at 25° C.

Another object of the present invention is to provide a more efficient and less costly process for the continuous manufacture of polydiorganosiloxanes from cyclic polysiloxane monomers.

In accordance with the present invention there is provided a process for the continuous manufacture of silicone polymers comprising the steps:

(a) mixing cyclopolysiloxane monomer and chainstopping agent, (b) preheating the mixture of cyclopolysiloxane monomer and chainstopping agent, (c) adding an amount of catalyst effective for catalyzing the polymerization reaction to the preheated mixture of cyclopolysiloxane monomer and chainstopping agent, (d) optionally, passing the catalyzed mixture of cyclopolysiloxane monomer and chainstopping agent to a mixer having static elements and/or a scraped surface reactor which provide essentially uniform plug flow characteristics to the catalyzed mixture passing therethrough, (e) passing the resulting mixture of cyclopolysiloxane monomer, chainstopping agent and catalyst to a screw extruder having plug flow, (f) adding at a point where the polymerization reaction is complete, an amount of neutralizing agent effective for neutralizing said catalyst, and (g) optionally, devolatilizing the resulting silicone gum.

DESCRIPTION OF THE DRAWING

The accompanying drawing depicts, in schematic form, a flow diagram for the preferred process of the present invention.

DESCRIPTION OF THE INVENTION

Referring to the drawing, a starting material such as octamethylcyclotetrasiloxane (methyl tetramer) 10 is introduced into the preferred polymerization process of the present invention through feedline 11 and pump 12.

Optionally, feedline 11 can be split so that the cyclopolysiloxane monomer is also introduced into the process through feedline 11a and pump 12a. By splitting the monomer feedline in such a manner more uniform mixing of the monomer with chainstopper 13 and 14 is obtained at juncture 15. Vinyl chainstopper and methyl chainstopper 14 are introduced to the process through pumps 16 and 17 either alone or in combination, depending upon the intended end use of the polymeric product. Those skilled in the art recognize that other chainstoppers may be utilized in place of, or in addition to, vinyl chainstopper 13 and methyl chainstopper 14 as described more fully hereinbelow.

In one embodiment of the present invention vinyl-containing cyclopolysiloxane such as vinyl tetramer 18 (e.g. tetramethyltetravinylcyclotetrasiloxane) is added through pump 19 so that at juncture 15 there is obtained a mixture of methyl tetramer, vinyl tetramer and chain-stopping agent. The addition of such vinyl tetramer to the system provides to the end product additional cross-linking sites which make such end product more easily curable than if only methyl groups were present.

Such mixture of methyl tetramer, chainstopping agent and, optionally, vinyl tetramer, is preferably passed through a drying means 20. A number of suitable drying means 20 are well known in the art, however, it is particularly preferred that molecular sieves be employed in the practice of the present invention. It should be noted that, as illustrated in the drawing, it is desirable to utilize two or more molecular sieves in parallel so that one can be used for drying while the other is being regenerated. The reason that it is desirable to pass the reactants through drying means 20 is to eliminate water which will terminate or chainstop diorganopolysiloxane polymer with silanol groups and thus reduce the viscosity of the polymer and change the nature of its interaction with a filler.

In one embodiment of the invention the dried reactants present in feedline 21 can be passed to a preheater (not shown) wherein the temperature of the monomers is raised to at least 130° C. but below the boiling temperature of the monomers. Such preheated monomers are then degassed in a gas-liquid separating tank (not shown) and passed to preheater 22.

Preheater 22 typically utilizes a hot oil to heat the reactants to the temperature at which prereaction is effected. In the present disclosure prereaction, prereactor and the like means that it relates to the initial polymerization of the monomers to form silicone fluids and lower viscosity silicone gums. The exact viscosity of the polymer at any given point in the process depends upon the intended viscosity of the final product, as will be set forth more fully hereinbelow. Generally the optional prereaction system, which includes static prereactor 28 and scraped surface prereactor 30 is operated at a temperature in the range of from about 130° C. to about 200° C., more preferably at a temperature of about 140° C. to about 180° C. and most preferably at a temperature of about 160° C. to about 170° C. It should be noted that although the prereaction components of the process are optional, it is preferable that at least one prereactor be included as otherwise the screw extruder, which is the most expensive component, will be unduly large, thereby substantially increasing the cost of the capital equipment of the process.

The preheated monomer reactants exit preheater 22 through line 23 and are combined with a suitable catalyst at juncture 24. While any catalyst that is dispersible in the reactants and resulting polymer is suitable for practicing the present invention, it is especially preferred that potassium silanolate 25 be utilized and that its introduction into the system be regulated by pump 26. Although it is less desirable, it nevertheless is within the intended scope of the invention to add the catalyst prior to preheating.

The hot catalyzed monomeric reactants pass through feedline 27 into static prereactor 28 wherein the initial polymerization reaction occurs. The input entering static prereactor 28 through feedline 27 typically is almost 100% monomer, however, a small amount of polymerization may occur before entering static prereactor 28. The material exiting static prereactor 28 through line 29 can have a room temperature viscosity of up to about 2,000,000 centipoise, but the viscosity is of course much less at the operating temperature of prereactor 28. It is important that static prereactor 28 provide essentially plug flow passage of the reactants therethrough so that all of the reactants have substantially the same residence time within the mixer.

Partially polymerized material in line 29 is optionally introduced into scraped surface prereactor 30. The higher the viscosity of the desired end product, the more desirable it is to include scraped surface prereactor 30. Polymer exiting scraped surface prereactor 30 via line 31 generally has increased in viscosity by about 100%. Thus, polymer in line 31 can have a viscosity, measured at room temperature, as high as about 4,000,000 centipoise. Generally, however, the viscosity of polymer in line 31 should not exceed about 1,000,000 centipoise measured at 25° C.

From feedline 31 the partially polymerized polymer passes to screw extruder 32 which has plug flow and wherein a polymeric gum of at least 500,000 centipoise measured at 25° C. is provided. In the preferred embodiment of the instant process, the resulting silicone gum typically has a viscosity measured at 25° C. ranging from about 2 million centipoise to about 150 million centipoise. Accordingly it will be appreciated by the skilled artisan that the lower the viscosity of the desired end product, the higher the conversion of cyclics to polymer possible at each step of the process. Thus, for example, the percent cyclics in the material in line 29 can be from 30% if a lower viscosity gum is desired to 60% or more if a higher viscosity gum is desired. Similarly, line 31 may contain only slightly more than 15% cyclics if a low viscosity polymer is being prepared, 30% cyclics if a soft gum is being prepared, and as much as 50% or more cyclics if a hard gum is being prepared.

As is well known in the art, the polymerization of polysiloxanes equilibrates when there is present approximately 15% cyclopolysiloxanes and 85% polymer. Accordingly when the polymer has reached the desired viscosity and the reaction has equilibrated, a suitable neutralizing agent such as silyl phosphate 33 is introduced through pump 34 and feedline 35 to screw extruder 32 having plug flow. Screw extruder 32 is preferably designed in such a way that the polymerization reaction is completed in the early stages of the apparatus, and the last three to five diameters are reserved for neutralization and, optionally, devolitization of the polymer.

Preferably screw extruder 32 is a single screw kneader-reactor, for example, of the type available from Buss-Condux, Inc. Other suitable reactors such as conventional single screw and multiscrew extruder are known to those skilled in the art or can be devised without undue experimentation. It should be noted that heretofore screw extruders have been utilized primarily for extruding and compounding, but as far as is known have not been employed to polymerize cyclic polysiloxanes to polydiorganosiloxane gums.

Generally screw extruder 32 is operated at a temperature in the range of from about 130° C. to about 250° C. More preferably a single screw kneader-reactor of the type available from Buss-Condux, Inc. is operated at a temperature in the range of from about 175° C. to about 225° C., and most preferably the plug flow reactor 32 is operated at about 190° C. to about 210° C.

After the neutralizing agent has been added and the polymer has passed through the aforementioned 3 to 5 diameters for thoroughly effecting neutralization; if desired volatiles such as cyclopolysiloxanes can be removed through line 36. In the preferred embodiment illustrated by the drawing a vacuum source (not shown) causes the volatiles contained in plug flow reactor 32 to pass through line 36 to knockout tank 37 which prevents polymer from passing through line 38 to light ends condenser 39. The condensed volatiles pass through line 40 to holding tank 41 and eventually are returned through line 42 to line 21 for reaction in the process of the present invention. Typically such devolatilization takes place under a vacuum of 28 inches of mercury and reduces the level of volatiles present in the polymer to 2% or less.

The diorganopolysiloxane product is transferred to polymer storage tanks (not shown) by variable speed product discharge pump 43. To insure that the polymer is within acceptable viscosity and elasticity limits it is desirable to include a process rheometer 44 intermediate product discharge pump 43 and the polymer storage tanks. Of course, any on line instrumentation desired by the artisan can be utilized within the spirit and scope of the present invention, i.e. to measure the amount of chainstopper, viscosity, elasticity, the amount of water present and the like.

Suitable monomeric starting materials include cyclic siloxanes of the general formula

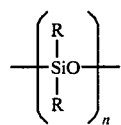

wherein n preferably is an integer from 3 to 8, more preferably is 3, 4 or 5, and most preferably is 4. R is a substituted or unsubstituted alkyl or alkenyl radical such as methyl, ethyl, propyl, vinyl, allyl, chloromethyl, bromomethyl, trifluoropropyl, cyanoethyl and the like, or a substituted or unsubstituted aryl, aralkyl or alkaryl radical such as phenyl, tolyl, chlorophenyl phenylethyl, alpha-cyanophenylethyl and the like. It should be emphasized that as far as is known there is no particular limitation as to the variety of cyclopolysiloxanes which can be utilized in the practice of the present invention. However, when R is a halosubstituted alkyl radical particular attention must be paid to the process operating parameters. For example, if the temperature is too high the halo radical may be extracted from the R group. Accordingly it is preferable that R be an unsubstituted hydrocarbon radical. Included within the scope of cyclopolysiloxanes are short chained polysiloxanes containing terminal OH groups mixed with cyclopolysiloxanes. Such mixtures result, for example, from hydrolysis of diorganosilanes.

Although octamethylcyclotetrasiloxane (methyl tetramer) is the preferred cyclopolysiloxane monomer starting material, it is also possible to employ trimers, pentamers, hexamers, etc. and mixtures of any such cyclic polysiloxanes. It should also be noted that while the organic substituents most often are methyl radicals, this is not critical to the process of the present invention.

The chainstopping agent, which halts the polymerization reaction and thereby limits the average molecular weight, can be any of the chainstopping agents known to those skilled in the art. Suitable chainstopping agents include vinyl chainstopper, trialkylsiloxy chainstopper such as methyl chainstopper, silanol chainstopper or mixtures thereof, depending on the intended use of the final product.

Generally vinyl chainstopper has the general formula

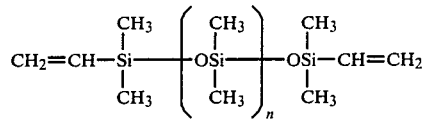

where n can vary from 0 to about 25.

Trimethylsiloxy chainstopper typically has the formula

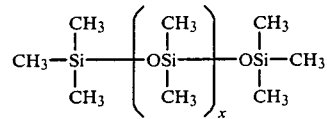

where x usually is about 2, but can be as high as 1000 or more.

Silanol chainstopper can be water or a low molecular weight silanol endstopped polymer of the formula

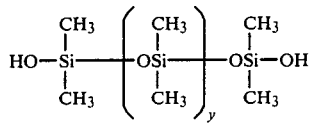

where y can vary from 0 to approximately 2000, and typically is about 9.

It should be understood that the foregoing are merely examples of chainstoppers well known to those skilled in the art and that other chainstoppers can also be employed in the process of the present invention.

The catalysts utilized in practicing the process of the invention are preferably basic polymerization catalysts such as cesium hydroxide, potassium hydroxide, sodium hydroxide, lithium hydroxide and their analogues cesium silanolate, potassium silanolate, sodium silanolate and lithium silanolate. These various catalyzing agents have different relative reactivities with respect to the present polymerization process, and accordingly, compensation must be made for them. For example, sodium hydroxide will catalyze the reaction more slowly than the others, and therefore the reaction takes longer at any given temperature. On the other hand, cesium hydroxide causes reaction to take place more rapidly. Thus cesium hydroxide may be more effective when a lower reaction temperature is employed or when it is desired to produce a silicone gum having a very high viscosity.

It has been found that the preferred basic catalyst is potassium silanolate which is an active form of potassium hydroxide and which is also very soluble in a monomer solution such as octamethylcyclotetrasiloxane.

The catalyst concentration can be from about 5 ppm to about 500 ppm of Equivalent KOH. The KOH equivalence of potassium silanolate ranges from approximately 0.05% to 6.0% KOH by weight. In the preferred embodiment of the process of the present invention potassium silanolate is employed at a KOH concentration of about 20 ppm by weight.

Of course, it is also possible to employ acid catalysts, e.g. $CF_3SO_3H$, which have to be neutralized with alkaline substances. This is known to those skilled in the art and need not be set forth in detail.

The preferred neutralizing agents which can be utilized in practicing the preferred process of the present invention may be any of the mild acids effective for neutralizing the basic catalyst. Such neutralizing agent can be selected from, for example, phosphoric acid, tris(chloroethyl)phosphite and silyl phosphate. In the most preferred embodiment silyl phosphate is utilized because it is quite soluble in siloxane polymers and allows for rapid neutralization. The flow of silyl phosphate is controlled so that the equivalent of approximately one mole equivalent of phosphoric acid is added for every mole equivalent potassium hydroxide in the polymer.

The monomer feed rate is determined by the amount of residence time required for polymerization as well as the volume of the polymerization apparatus. Residence time required is determined by the desired degree of completion of the polymerization and the rate of polymerization, which are controlled by temperature and, secondarily, by catalyst concentration. Such determinations can readily be made by those skilled in the art without undue experimentation.

The following Examples illustrate that by utilizing the process of the present invention the production efficiency for silicone gums is substantially improved. For instance, prior to the present invention silicone gums were commonly prepared by a batch process requiring aa long as 48 hours. However, as a result of the present invention it is now possible to continuously produce 0.9 to 3 liters/hr product per liter of processing volume, wherein the cycle time is only about 30 minutes.

EXAMPLES 1-11

In the examples the catalyst is a polydimethylsiloxane containing potassium hydroxide in the form of potassium silanolate groups and is a siloxane soluble potassium hydroxide catalyst. Workable and practicable potassium silanolate may contain up to approximately 5% by weight of equivalent potassium hydroxide.

The neutralizing agent, silyl phosphate, is a polydimethysiloxane containing phosphoric acid in the form of silyl phosphate groups and is a siloxane soluble form of phosphoric acid.

The monomer in each case was octamethylcyclotetrasiloxane (methyl tetramer) and the feed rate varied from 600 ml/minute to 1250 ml/minute.

Other process parameters and physical properties of the resulting gums are set forth in Tables I., II. and III.

The examples illustrate a process for the continuous polymerization of cyclopolysiloxanes to polydiorganosiloxanes having a viscosity greater that 500,000 centipoise at 25° C.

In the process monomer and chainstopper were combined and preheated to the temperature shown in Table II. Thereafter approximately 23 or 24 ppm catalyst measured as ppm KOH was added to the monomer/chainstopper mixture. Such catalyzed mixture then entered a first prereactor wherein initial polymerization was effected. Although not measured, the viscosity of the polymer exiting such first prereactor appeared to have a viscosity of less than 1,000,000 cps. measured at 25° C. After exiting the first prereactor the partially polymerized material entered a second prereactor. Again, although the viscosity was not measured, it appeared to be less than about 2,000,000 centopoise measured at 25° C. At this point the partially polymerized material entered the screw extruder, which in this case was a single screw Buss-Condux apparatus which also provided kneading action on the polymer. The temperature of each prereactor and at various locations within the Buss-Condux screw extruder are also set forth in Table II. In each case the Fryma speed was 33 rpm and the Buss-Condux speed in rpm is provided in Table I. Following neutralization and devolatilization the finished product was tested for percent volatiles, elasticity and viscosity.

TABLE I

| | General Operating Conditions | | | |
|---|---|---|---|---|
| Example | Monomer Feed Rate ml/min | Neutralizer Feed Rate gms/min | Vac. Inches Hg | Extruder Speed rpm |
| 1 | 600 | 3.8 | — | 45 |
| 2 | 750 | 1.9 | 23 | 70 |
| 3 | 750 | 1.9 | 28 | 70 |
| 4 | 750 | 1.7 | 28 | 70 |
| 5 | 750 | 1.7 | 28 | 70 |
| 6 | 750 | 1.7 | 27.5 | 70 |
| 7 | 1000 | 2.25 | 27.5 | 80 |
| 8 | 1000 | 2.25 | 27.5 | 80 |
| 9 | 1000 | 2.25 | 28 | 80 |
| 10 | 1250 | 2.9 | 27.5 | 100 |
| 11 | 1250 | 2.9 | 27.5 | 100 |

TABLE II

| | | Reaction Temperatures | | | | | | |
|---|---|---|---|---|---|---|---|---|
| Example | Heat Exchange Temp ° | Prereact Temp °C. | | Kneader Temp °C. | | | | |
| | | 1 | 2 | 1 | 2 | 3 | 4 | 5 | 6 |
| 1 | 160 | 140 | 174 | 208 | 192 | 200 | 201 | 204 | 208 |
| 2 | 161 | 145 | 170 | 238 | 240 | 201 | 230 | 235 | 232 |
| 3 | 162 | 130 | 156 | 212 | 218 | 187 | 199 | 207 | 205 |
| 4 | N/A | N/A | N/A | 214 | 216 | 191 | 205 | 219 | 212 |
| 5 | 159 | 140 | 165 | 225 | 230 | 186 | 205 | 217 | 214 |
| 6 | 160 | 144 | 167 | 216 | 215 | 187 | 206 | 218 | 201 |
| 7 | 161 | 146 | 173 | 216 | 220 | 203 | 225 | 238 | 213 |
| 8 | 162 | 145 | 171 | 215 | 220 | 203 | 224 | 237 | 212 |
| 9 | 162 | 145 | 173 | 222 | 225 | 215 | 242 | 250 | 220 |
| 10 | 175 | 158 | 187 | 232 | 236 | 211 | 235 | 250 | 228 |
| 11 | 176 | 160 | 188 | 227 | 232 | 211 | 234 | 249 | 225 |

TABLE III

| | Gum Physical Properties | | |
|---|---|---|---|
| Examples | % Volatiles in Gum | Elasticity Modulus | (cps × 10⁶) Viscosity |
| 1 | 14 | 87,057 | 5.2 |
| 2 | 6.2 | 24,930 | 16.0 |
| 3 | N/A | 72,700 | 29.0 |
| 4 | 1.3 | 50,100 | 27.0 |
| 5 | 3.0 | 14,205 | 85.3 |
| 6 | 3.0 | 44,600 | 26.3 |
| 7 | 2.1 | 15,400 | 49.1 |
| 8 | 1.5 | 11,080 | 115.2 |
| 9 | 0.8 | 19,154 | 138.6 |
| 10 | 3.3 | 22,373 | 89.6 |
| 11 | 1.6 | 11,052 | 56.2 |

As can be appreciated from the results provided in Tables I., II., and III., the present invention provides a novel process for continuously manufacturing polydiorganosiloxanes having a viscosity greater than 500,000 centipoise. Such novel process results in a uniquely uniform polymeric product which has properties that exhibit a remarkable degree of consistency and ensures uniformity of performance unavailable to products made by prior art processes. Additionally the ability to produce a uniform product on a continuous basis results in a process which is more efficient than those of the prior art.

EXAMPLES 12-15

A series of silicone rubber compositions were then prepared utilizing silicone gums or mixtures of silicone gums having a viscosity of about 30 million centipoise at 25° C. which were manufactured by the process of the present invention (Examples 12-14) as well as a comparative example (Example 15) which utilized a similar silicone gum manufactured by a batch process. Such silicone rubbers were formulated as set forth in Table IV. (the values as parts by weight).

TABLE IV

| Example | 12 | 13 | 14 | 15 |
|---|---|---|---|---|
| parts example #2 gum | 925 | — | — | — |
| parts example #6 gum | — | — | 1387.5 | — |
| parts example #7 gum | — | 1850 | — | — |
| parts example #10 gum | 925 | — | 462.5 | — |
| parts batch gum | — | — | — | 1850 |
| parts silanol stopped process aid | 30 | 30 | 30 | 30 |
| parts trimethoxy stopped process aid | 30 | 30 | 30 | 30 |
| parts vinyl silazane process aid | 5.92 | 5.92 | 5.92 | 5.92 |
| parts cyclopolysiloxane treated filler | 1068 | 1068 | 1068 | 1068 |

Two hundred parts of each sample were then combined with 2 parts magnesium oxide and 2.4 parts of catalyst. Such mixtures were then formed into sheets and heat cured at 287° F. for 10 minutes. The physical properties of the heat cured rubbers were then tested and the results are set forth in Table V.

TABLE V

| Example | 12 | 13 | 14 | 15 |
|---|---|---|---|---|
| Shore A hardness | 53 | 52 | 52 | 51 |
| Tensile Strength, psi | 1503 | 1425 | 1399 | 1310 |
| Elongation, % | 530 | 500 | 510 | 500 |
| Tear D | 103 | 97 | 103 | 90 |

From the foregoing it can be appreciated that gums prepared in accordance with the process of the present invention are at least as good as those prepared by prior art batch processes with respect to their suitability for use in heat curable silicone rubber compositions.

I claim:

1. A process for the continuous polymerization of polydiorganosiloxanes comprising:
    (a) mixing one or more cyclopolysiloxane monomers with one or more chainstopping agents,
    (b) preheating the mixture resulting from (a),
    (c) adding to the preheated mixture of (b) an amount of catalyst effective for catalyzing a polymerization reaction,
    (d) polymerizing the catalyzed mixture of (c) in a screw extruder having essentially plug flow therethrough, and
    (e) adding to the resulting polydiorganosiloxane an amount of neutralizing agent effective for neutralizing said catalyst.

2. A process for the continuous polymerization of polydiorganosiloxane comprising:
    (a) mixing one or more cyclopolysiloxane monomers with one or more chainstopping agents,
    (b) preheating the mixture resulting from (a),
    (c) adding to the preheated mixture of (b) an amount of catalyst effective for catalyzing a polymerization reaction,
    (d) partially polymerizing the catalyzed mixture of (c) in a static mixer and/or a scraped surface reactor having essentially plug flow therethrough,
    (e) passing the partially polymerized mixture of (d) to a screw extruder having essentially plug flow therethrough and completing the polymerization reaction therein, and
    (f) adding to the resulting polydiorganosiloxane an amount of neutralizing agent effective for neutralizing said catalyst.

3. A process as set forth in claims 1 or 2 wherein after mixing one or more cyclopolysiloxane monomers with one or more chainstopping agents, the resulting mixture is passed through a drying means.

4. A process as set forth in claim 3 wherein said drying means is a molecular sieve.

5. A process as set forth in claim 3 wherein after the mixture of one or more cyclopolysiloxanes and one or more chainstopping agents is passed through a drying means, said mixture is preheated and degassed.

6. A process as set forth in claim 2 wherein the partial polymerization of step (d) is effected at a temperature within the range of from about 130° C. to about 200° C.

7. A process as set forth in claim 2 wherein the partial polymerization of step (d) is effected at a temperature within the range of from about 140° C. to about 180° C.

8. A process as set forth in claim 1 or 2 wherein the cyclopolysiloxane monomer has the formula

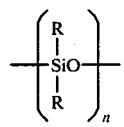

wherein n is an integer from 3 to 8 and R is a substituted or unsubstituted hydrocarbon radical.

9. A process as set forth in claim 8 wherein n is an integer equal to 3, 4 or 5 an R is an unsubstituted hydrocarbon radical.

10. A process as set forth in claim 8 wherein n equals 4 and R is methyl.

11. A process as set forth in claims 1 or 2 wherein the chainstopping agent is selected from the group consisting of trialkylsiloxy chainstopper, dialkylvinylsiloxy chainstopper and silanol chainstopper.

12. A process as set forth in claims 1 or 2 wherein the preheating of step (b) results in the mixture of cyclopolysiloxanes and chainstopping agents from step (a) having a temperature in the range of from about 150° C. to about 175° C.

13. A process as set forth in claims 1 or 2 wherein the catalyst is potassium silanolate and the neutralizing agent is silyl phosphate.

14. A process as set forth in claims 1 or 2 wherein the resulting polydiorganosiloxane has a viscosity of at least 500,000 centipoise when measured at 25° C.

15. A process as set forth in claims 1 or 2 wherein the resulting polydiorganosloxane has a viscosity of at least 1,000,000 centipoise when measured at 25° C.

16. A process as set forth in claims 1 or 2 wherein the resulting polydiorganosiloxane has a viscosity ranging from about 2,000,000 to about 150,000,000 centipoise when measured at 25° C.

17. A process as set forth in claims 1 or 2 wherein the screw extruder having essentially plug flow therethrough is a single screw extruder.

18. A process as set forth in claim 17 wherein said single screw extruder also provides kneading.

19. A process as set forth in claims 1 or 2 wherein the screw extruder having essentially plug flow therethrough is operated at a temperature within the range of from about 130° C. to about 250° C.

20. A process as set forth in claims 1 or 2 wherein the screw extruder having essentially plug flow therethrough is operated at a temperature within the range of from about 175° C. to about 225° C.

21. A process as set forth in claims 1 or 2 wherein after neutralization of the catalyst contained in the resulting polydiorganosiloxane, said polydiorganosiloxane is substantially devolatilized.

22. A process as set forth in claim 21 wherein cyclopolysiloxanes removed by said devolatilization step are recycled for mixing with newly introduced cyclopolysiloxane monomer and chainstopping agent.

23. A process for the continuous polymerization of polydiorganosiloxane gums having a viscosity of from 2,000,000 to 150,000,000 centipoise at 25° C., comprising the steps:

(a) mixing octamethylcyclotetrasiloxane with a chainstopping agent selected from the group consisting of trialkylsiloxy chainstopper, dialkylvinylsiloxy chainstopper and silanol chainstopper, (b) preheating the mixture resulting from step (a) to a temperature ranging from about 150° C. to about 175° C., (c) adding to the preheated mixture of step (b) an amount of potassium silanolate catalyst effective for catalyzing a polymerization reaction, (d) partially polymerizing the catalyzed mixture resulting from step (c) in a static mixer and/or a scraped surface reactor having essentially plug flow therethrough at a temperature in the range of from about 140° C. to about 180° C., (e) passing the partially polymerized mixture resulting from step (d) to a single screw extruder having kneading action and essentially plug flow therethrough, and completing the polymerization reaction therein at a temperature ranging from about 175° C. to about 225° C., (f) adding to the resulting polydiorganosiloxane having a viscosity ranging from 2,000,000 to 150,000,000 centipoise at 25° C., an amount of silyl phosphate effective for neutralizing said potassium silanolate catalyst, (g) substantially devolatilizing the polydiorganosiloxane resulting from step (f), and (h) recycling cyclopolysiloxanes obtained in step (g) for mixing with newly introduced cyclopolysiloxane monomer and chainstopping agent.

24. A process as set forth in claim 23 wherein after mixing said octamethylcyclotetrasiloxane and said chainstopping agent, the resulting mixture is passed through a drying means.

25. A process as set forth in claim 24 wherein after said mixture of octamethylcyclotetrasiloxane and chainstopping agent is dried, said mixture is preheated and degassed.

* * * * *